US007577625B2

(12) United States Patent
Zhang

(10) Patent No.: US 7,577,625 B2
(45) Date of Patent: Aug. 18, 2009

(54) HANDLING OF SATISFACTION AND CONFLICTS IN A QUANTIFIED BOOLEAN FORMULA SOLVER

(75) Inventor: Lintao Zhang, Sunnyvale, CA (US)

(73) Assignee: Microsoft Corporation, Redmond, WA (US)

( * ) Notice: Subject to any disclaimer, the term of this patent is extended or adjusted under 35 U.S.C. 154(b) by 193 days.

(21) Appl. No.: 11/328,009

(22) Filed: Jan. 9, 2006

(65) Prior Publication Data

US 2007/0179920 A1 Aug. 2, 2007

(51) Int. Cl.
*G06N 5/02* (2006.01)
*G06N 5/04* (2006.01)
(52) U.S. Cl. .............................. 706/19; 706/46; 706/57
(58) Field of Classification Search .................... 706/19, 706/45, 57
See application file for complete search history.

(56) References Cited

OTHER PUBLICATIONS

Zhang et al., "Towards a Symmetric Treatment of Satisfaction and Conflicts in Quantified Boolean Formula Evaluation", 2002.*
Biere, A., "Resolve and Expand", *Proceedings of the 7th International Conference on Theory and Applications of Satisfiability Testing (SAT '04)*, May 2004, 12 pages.
Cadoli, M. et al., "An Algorithm to Evaluate Quantified Boolean Formulae", *Proceedings of the 16th National Conference on Artificial Intelligence (AAAI-98)*, 1998, 6 pages.
Giunchiglia, E. et al., "Learning for Quantified Boolean Logic Satisfiability", *18th National Conference on Artificial Intelligence (AAAI-02)*, 2002, 6 pages.
Letz, R., "Lemma and Model Caching in Decision Procedures for Quantified Boolean Formulas", *TABLEAUX*, 2002, LNAI 2381, 160-175.
Zhang, L. et al., "Conflict Driven Learning in a Quantified Boolean Satisfiability Solver", *Proceedings of International Conference on Computer Aided Design (ICCAD2002)*, 8 pages.
Zhang, L. et al., "Towards a Symmetric Treatment of Satisfaction and Conflicts in Quantified Boolean Formula Evaluation", *Proceedings of the 8th International Conference on Principles and Practice of Best Paper Award Winner Constraint Programming (CP2002)*, 2002, 15 pages.

* cited by examiner

*Primary Examiner*—David R Vincent
*Assistant Examiner*—Nathan H Brown, Jr.
(74) *Attorney, Agent, or Firm*—Woodcock Washburn LLP

(57) ABSTRACT

In order to provide for more efficient QBF satisfiability determination, the formula to be checked is transformed into one formula which is equi-satisfiable, and one which is equi-tautological. The conjunction or disjunction of these two formulas, then, is used to determine satisfiability, with the result being that a determination of satisfiability is more easily achieved. A conjunctive normal form transformation of the initial formula yields a group of clauses, only one of which must be unsatisfiable for the formula to be unsatisfiable. A disjunctive normal form transformation of the initial formula yields a group of cubes, only one of which must be satisfiable in order for the formula to be determined to be satisfiable.

6 Claims, 4 Drawing Sheets

HANDLING OF SATISFACTION AND CONFLICTS IN A QUANTIFIED BOOLEAN FORMULA SOLVER

BACKGROUND

A propositional Boolean formula consists of Boolean variables connected by logical operators. Example operators include logical and ($\wedge$), logical or ($\vee$), and logical negation ($\neg$). Given such a formula, the Boolean Satisfiability (SAT) problem asks the question whether there exists an assignment for the variables such that the formula evaluates to true. If there exists such an assignment, the formula is said to be satisfiable. If no such assignment exists, the formula is said to be unsatisfiable. For example, formula $(\neg x \vee \neg y) \wedge y$ is satisfiable with satisfying assignment x=false and y=true, while formula $(\neg x \vee \neg y) \wedge x \wedge y$ is unsatisfiable.

The determination of satisfiability for arbitrary formulae—that is, the SAT problem—is known to be NP-Complete. NP-Complete is a complexity class of problems generally not believed to be solvable in polynomial time. Still, there exist many techniques to solve SAT problems generated from real world applications efficiently in practice. Because of this, SAT solver is widely used in many applications and is considered to be one of the most important tools for logic reasoning.

A Quantified Boolean Formula (QBF) is a generalized form of a Boolean formula that contains quantifiers. Quantifiers are of two types: universal or existential. As defined, universal quantifier $\forall x\ f(x)$ means $f(true) \wedge f(false)$. Thus, for any assignment (true or false) of variable x, $f(x)$ has to evaluate to true to make $\forall x\ f(x)$ evaluates to true. The existential quantifier $\exists x\ f(x)$ means $f(true) \vee f(false)$. Thus, to make $\exists x\ f(x)$ true, for at least one assignment (true or false) of variable x, $f(x)$ has to be true.

Given a QBF where all of its variables are quantified, the question of determining whether the formula evaluates to true or false is called a QBF satisfiability problem, sometimes called QBF problem. In a QBF formula, a variable is called a universal variable if it is universally quantified; it is called an existential variable if it is existentially quantified.

An example of a QBF formula is the following formula (1):

$$\forall x \exists y (\neg x \vee \neg y) \wedge (\neg x \vee \neg y) \quad (1)$$

The formula means that, for all values of x ("$\forall x$"), there exists a value for y ("$\exists y$") which satisfies the propositional Boolean formula "$(\neg x \vee \neg y) \wedge (\neg x \vee \neg y)$". In the example of formula (1), the quantifiers are at the beginning of the formula, this is called prenex form. All QBF formulas can be transformed into prenex form. In this form, the quantified variables are grouped into different groups. In this example, the innermost group is existential with a single variable y, and outermost group is a universal group containing the variable x.

Because a propositional Boolean formula is considered satisfied if at least one assignment of values to variables leads to an evaluation of the formula as true, SAT can be regarded as a special case of QBF problem, with all the variables being existential. In the general case, QBF problem is known to belong to a class of problems called P-Space Complete, which is believed to be more difficult than SAT.

The most widely used technique for solving SAT is the well known Davis-Logemann-Loveland (DLL) search based technique. To use this technique, the Boolean formula is transformed into Conjunctive Normal Form (CNF) by introducing auxiliary variables. The resulting CNF formula is equi-satisfiable to the original formula, means that if the CNF formula is satisfiable, then the original formula is as well, and if the CNF formula is not satisfiable, then the original formula is not.

A CNF formula is a logical and ($\wedge$) of one or more clauses, each clause is a logical or ($\vee$) of one or more literals. A literal is either the positive or the negative form of a variable, e.g. "x" or "$\neg x$", where x is a variable. Because it is the logical and of the clauses, to satisfy a CNF formula, each clause must be satisfied individually. Additionally, for a certain clause, if all but one of its literals has been assigned the value false, then the remaining literal must be assigned the value true in order to satisfy this clause. Such a clause is called a unit clause. If all literals in a clause are assigned value false, then the clause evaluates to false and the formula cannot be satisfied under current assignment. Such a clause is called a conflict clause.

The DLL algorithm is a search based algorithm that finds a satisfying solution by branching, deducing and backtracking. The branch process chooses a variable and assigns it with a value (true or false). The deduction process then looks at the clauses and detects any clause that is a unit clause or a conflict clause, given the values that have been assigned to the variables. If there is a unit clause, it assigns the free variable in the unit clause a value in order to make it satisfy the clause. If there is a conflict clause, the solver backtracks to undo some of the branching decisions, and try a different search space (i.e. resolve the current conflict). If no unit clauses or conflict clauses are found, the branch process is invoked and another variable is assigned a value.

Smart decision heuristics have been proposed to improve the deduction process. Techniques have been developed to perform deduction efficiently. Processes such as learning in the conflict analysis and non-chronological backtracking procedures have been developed to prevent the same conflicts from occurring in the future search. These techniques make SAT solver very efficient in practice.

The DLL technique is described in the following pseudo-code in Table 1:

TABLE 1

DLL Technique for SAT Solver Pseudocode

```
DLL Technique for SAT ( )
{
   while(true)
   {
      decide_next_branch( );           //Branching
      while (true)
      {
         status = deduce( );           //Deducing
         if (status == conflict)
         {
            blevel = analyze_conflicts( );   // Resolve Conflict
            if (blevel < 0)
               return UNSATISFIABLE;
            else
               back_track(blevel);     //Backtracking
         }
         else if (status == satisfied)
            return SATISFIABLE;        //Found Satisfying Assignment
         else
            break;
      }
   }
}
```

This code describes a loop which sets an assignment (decide_next_branch) and attempts to determine if there's a conflict (deduce). If there is a conflict ("status==conflict") then the conflict is analyzed to see how many levels of branching should be backtracked ("backtrack (blevel))") or to see if there is no option for satisfiability ("if (blevel<0) return UNSATISFIABLE"). If deduce has found an assignment which makes the formula satisfied, this is returned ("return SATISFIABLE").

The DLL technique has also been adapted by many researchers to solve the QBF problem as well. The DLL technique for solving QBF can be described in pseudo code as follows in Table 2:

TABLE 2

DLL Technique for QBF Solver Pseudocode

```
DLL Technique for QBF ( )
{
   while(true)
   {
      decide_next_branch( );       //Branching
      while (true)
      {
         status = deduce( );          //Deducing
         if (status == conflict)
         {
            blevel = analyze_conflicts( );  //analyze how to
                                            //resolve conflict
            if (blevel < 0)
               return UNSATISFIABLE;
            else
               back_track(blevel);      //Backtracking
         }
         else if (status == satisfied)
         {
            blevel = analyze_satisfaction( );  //how to resolve
                                               //satisfaction
            if (blevel < 0)
               return SATIAFIABLE;
            else
               back_track(blevel);      //Backtracking
         }
         else
            break;
      }
   }
}
```

As can be seen, this DLL technique for QBF is very similar to DLL technique for SAT, except that in QBF, when a satisfied status is resulted from deduction, the solver needs to resolve the satisfaction and backtrack. The reason for this is because of the universally quantified variables. Since universal variables demand that the formula to be true regardless of whether the variable is assigned true or false, therefore, the solver needs to try both values for a universal variable before it can declare the formula to be satisfiable. In QBF solvers, a conflict clause does not necessarily have all its literals evaluate to false. Instead, there are well known rules to determine if a clause is conflicting or not. In the following, when in QBF context, we use these special rules to determine if a clause is conflict or if a cube is satisfied.

Different ways have been proposed to optimize the technique described above for QBF. Similar efficient deduction techniques and learning techniques as SAT solving have been proposed for QBF. These proposed techniques require that the input formula be in CNF. If the original formula is not in CNF, the solvers introduce new variables to make an equi-satisfiable CNF, and existentially quantify the new variables at the innermost quantification level.

Such a formulation has a serious shortcoming. In a CNF formula, it is easy to detect conflicts. As long as there is a single conflicting clause (in the SAT case, a clause with all literals evaluate to false, in QBF case, some similar rule concerning literals within a clause), the formula is conflicting. Efficient techniques have been proposed to perform this detection quickly. This is one of the reasons why the DLL technique is so successful determining SAT.

However, it is very difficult to detect satisfaction. To detect satisfaction in a CNF formula, the solver must make sure that each clause in the formula has at least one literal evaluate to true. This is an expensive operation. For DLL SAT solver, this shortcoming is not a big problem because we need to detection satisfaction only once. If it is satisfied, the solving process is over. However, for QBF problem, the difficulty in detecting satisfaction is a more serious problem, because both satisfaction and conflict need to be detected in the searching process. The satisfaction part is much more expensive to detect due to the asymmetry resulting from the CNF formulation of the problem. Thus, the CNF formulation helps with the determination of SAT using DLL technique, but for QBF it is time- and resource-consuming.

SUMMARY

In order to provide more efficient determination of QBF satisfiability, according to some embodiments, a set of clauses (comprising a logical or of literals) is found via a conjunctive normal form transformation of the propositional part of the initial formula. If any of the clauses is unsatisfiable then the propositional formula is unsatisfiable. Additionally, however, a set of cubes is found (each cube comprising a logical and of literal) via a disjunctive normal form transformation of the propositional part of the initial formula. If any of the cubes is satisfiable, then the propositional formula is satisfiable. The two sets, of clauses and cubes, are then used in order to determine satisfiability of the original QBF.

The two sets may be used by assigning values to variables, deducing whether a possible conflict or a possible satisfaction is present, and then, if no definitive determination has been reached on a conflict or satisfaction, reassigning values to variables. This is done, in some embodiments, according to the Davis-Logemann-Loveland search procedure.

In another embodiment, two formulas are produced from the propositional formula of the original QBF. One formula is equi-satisfiable with the formula. The other formula is equi-tautological with the formula—it is a tautology (i.e. a constant true) if and only if the original propositional formula is a tautology. An assignment of values to the variables of the formulas is found which either causes the first to be found to be unsatisfied or the second to be found to be satisfied, and thus a determination is made of the original QBF.

Only some embodiments of the invention have been described in this summary. Other embodiments, advantages and novel features of the invention may become apparent from the following detailed description of the invention when considered in conjunction with the drawings.

BRIEF DESCRIPTION OF THE DRAWINGS

The foregoing summary, as well as the following detailed description of preferred embodiments, is better understood when read in conjunction with the appended drawings. For the purpose of illustrating the invention, there is shown in the drawings exemplary constructions of the invention; however, the invention is not limited to the specific methods and instrumentalities disclosed. In the drawings.

DETAILED DESCRIPTION OF ILLUSTRATIVE EMBODIMENTS

Exemplary Computing Environment

Figure 1:
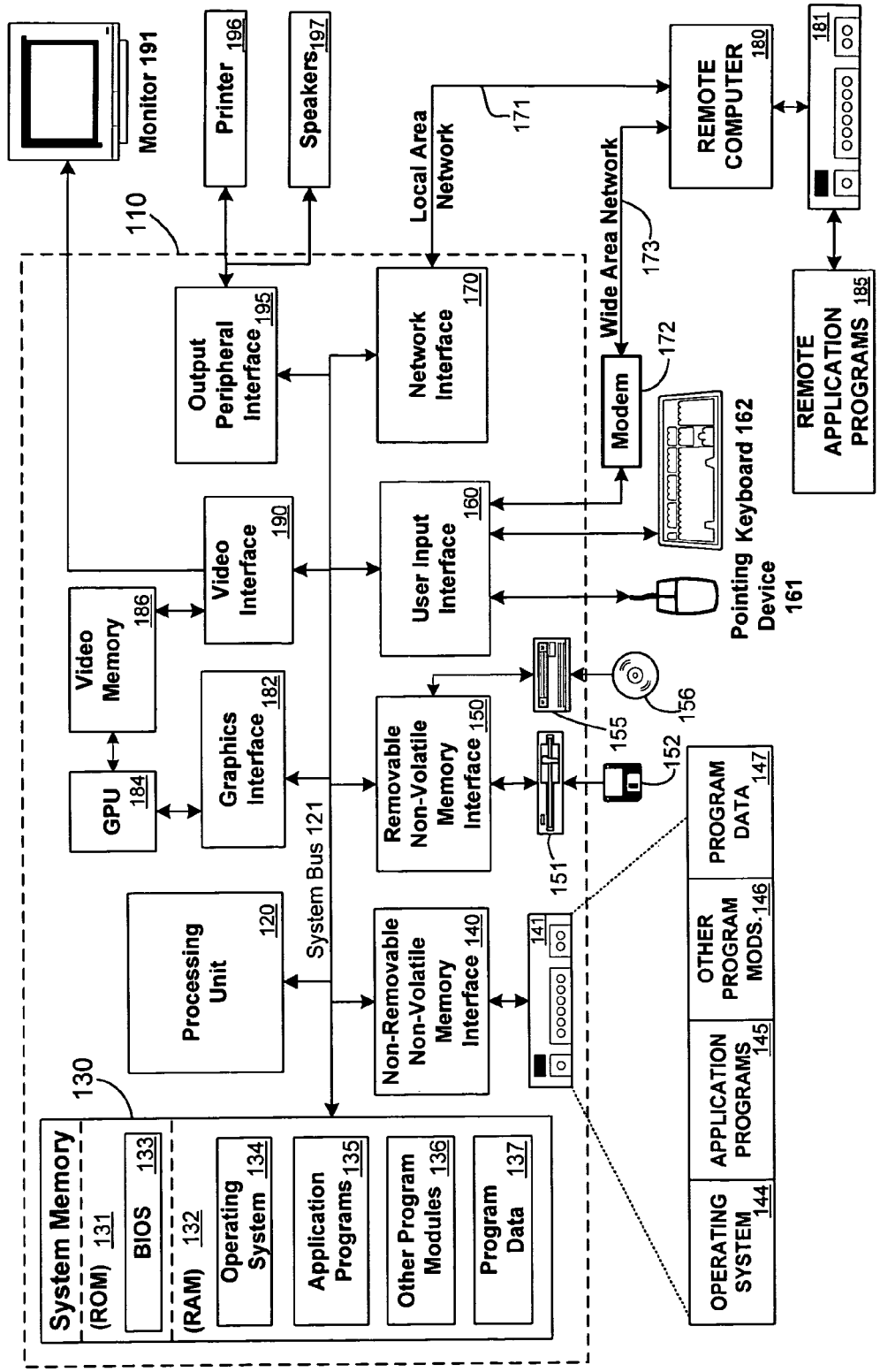
FIG. 1 is a block diagram of an exemplary computing environment in which aspects of the invention may be implemented.

FIG. 1 shows an exemplary computing environment in which aspects of the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary computing environment 100.

The invention is operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, embedded systems, distributed computing environments that include any of the above systems or devices, and the like.

The invention may be described in the general context of computer-executable instructions, such as program modules, being executed by a computer. Generally, program modules include routines, programs, objects, components, data structures, etc. that perform particular tasks or implement particular abstract data types. The invention may also be practiced in distributed computing environments where tasks are performed by remote processing devices that are linked through a communications network or other data transmission medium. In a distributed computing environment, program modules and other data may be located in both local and remote computer storage media including memory storage devices.

With reference to FIG. 1, an exemplary system for implementing the invention includes a general purpose computing device in the form of a computer 110. Components of computer 110 may include, but are not limited to, a processing unit 120, a system memory 130, and a system bus 121 that couples various system components including the system memory to the processing unit 120. The processing unit 120 may represent multiple logical processing units such as those supported on a multi-threaded processor. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus (also known as Mezzanine bus). The system bus 121 may also be implemented as a point-to-point connection, switching fabric, or the like, among the communicating devices.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices, or any other medium which can be used to store the desired information and which can accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/nonvolatile computer storage media. By way of example only, FIG. 1 illustrates a hard disk drive 140 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156, such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 110 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 195.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

QBF Solver

According to one embodiment of the invention, in order to more efficiently determine whether a given QBF is satisfiable, two formulas equivalent to the given QBF are created, one in conjunctive normal form (CNF) and one in disjunctive normal form (DNF). The two formulas are combined (using a logical or ($\vee$)) and the resulting formula is given to a QBF solver. As shown, this allows faster determination of satisfiability.

Any QBF formula can be expressed as shown in formula (2):

$$Q_1 x_1 \ldots Q_n x_n \phi \quad (2)$$

In formula (2), $\phi$ is a propositional formula involving variables $x_i$ (i=1 ... n). Each $Q_i$ is either an existential quantifier $\exists$ or a universal quantifier $\forall$. Because $\exists x \exists y\ \phi = \exists y \exists x\ \phi$ and $\forall x \forall y\ \phi = \forall y \forall x\ \phi$, the quantified variables can be grouped into disjoint sets where each set consists of adjacent variables with the same type of quantifier. Therefore, we can rewrite (2) into the following formula (3):

$$Q_1 X_1 \ldots Q_m X_m \phi \quad (3)$$

$X_i$'s are mutually disjoint sets of variables. Each variable in the formula must belong to one of these sets. It is well known that it is possible to introduce a set of auxiliary variables to transform $\phi$ into an equi-satisfiable Conjunctive Normal Form formula. Which means:

$$\phi = \exists Y \varphi(X, Y) \quad (4)$$

Here $\varphi(X, Y)$ is a CNF formula (i.e. a conjunction of clauses), which contains both the original variables X and the auxiliary variables Y. Formulas $\phi$ and $\varphi$ are called equi-satisfiable because if $\varphi$ is satisfiable with assignments to X and Y, then $\phi$ is also satisfiable with the same assignments to X. If $\phi$ is found to be satisfiable with assignments to variables X, then $\varphi$ can also be satisfiable by extending the same assignment to variables X with assignments to variables Y.

Because any propositional formula A is equivalent to A $\vee$ A and any propositional formula A is equivalent to $\neg\neg$A, $\phi$ can be rewritten as $\phi \vee \phi$, which is equivalent to $\phi \vee (\neg\neg\phi)$. Thus, as shown in formula (5), $\phi$ can be rewritten using formula (4) and these rules as follows:

$$\phi = \exists Y \varphi(X, Y) \vee (\neg(\neg\phi)) \quad (5)$$

Since $\neg\phi$ is itself a propositional formula, we can use existing technique to transform $\neg\phi$ into an equi-satisfiable CNF formula, similar as we did in (4):

$$\neg\phi = \exists Z \omega(X, Z) \quad (6)$$

Here $\omega$ is a CNF formula, and Z is the set of auxiliary variables introduced during the transformation. Now substituting (6) into (5), formula (7) is arrived at:

$$\phi = \exists Y \varphi(X, Y) \vee (\neg(\exists Z \omega(X, Z))) \quad (7)$$

Because it is true that: $\neg \exists x\ f(x) = \forall x\ \neg f(x)$, (7) can be rewritten as in formula (8):

$$\phi = \exists Y \varphi(X, Y) \vee \forall Z\ \neg\omega(X, Z) \quad (8)$$

As $\varphi$ does not contain Z variables, the scope of universal quantifier for Z can be broadened as shown in formula (9).

$$\phi = \exists Y \forall Z (\varphi(X, Y) \vee \neg\omega(X, Z)) \quad (9)$$

Thus, using formula (9), formula (3) can be rewritten:

$$Q_1 X_1 \ldots Q_m X_m \exists Y \forall Z (\varphi(X,Y) \vee \neg\omega(X,Z)) \quad (10)$$

Now, as discussed $\omega(X, Z)$ is in Conjunctive Normal Form (i.e. a logical or of one or more clauses, where a clause is a logical and of literals). Therefore, by DeMorgan's law, $\neg\omega(X, Z)$ is in Disjunctive Normal Form (i.e. a logical or of cubes, where a cube is a logical and of literals). Thus, the final form for the QBF being analyzed is shown in formula (11)

$$Q_1 X_1 \underset{(C_1 \wedge C_2 \ldots \wedge C_k)}{\ldots} Q_m X_m \exists Y \forall Z \atop (S_1 \vee S_2 \vee \ldots \vee S_l) \quad (11)$$

Here $C_1 \ldots C_k$ are clauses, and $S_1 \ldots S_l$ are cubes. The conjunction of $C_i$ equals $\varphi$, which is equi-satisfiable to $\phi$. The disjunction of $S_i$ equals $\omega$, which is equi-tautological to $\phi$, which means $\omega$ is a tautology (i.e. constant true) if and only if $\phi$ is a tautology. The 2 innermost levels of quantification orders can be changed. Thus, Y variables can be quantified first ($\exists Y \forall Z$) or Z variables first ($\forall Z \exists Y$). Since $\phi$ also equals $\phi \wedge \phi$, the two parts of the formula can also be logically and-ed instead of logically or-ed. i.e. the final formula can also be:

$$Q_1 X_1 \ldots Q_m X_m \exists Y \forall Z (C_1 \wedge C_2 \ldots \wedge C_k) \wedge \atop (S_1 \vee S_2 \vee \ldots \vee S_l) \quad (12)$$

Since the CNF part (the $C_i$ conjunction) and the DNF part (the $S_i$ part) are logically equivalent, by doing this transformation, whenever a conflict occurs (i.e. when φ evaluates to false), one of the clauses in $C_i$ will be a conflicting clause, whenever a satisfaction occurs (i.e. when φ evaluates to true), one of the cubes in $S_i$ will be a satisfying cube.

After this transformation, a modified version of the DLL QBF solver can be used on the resulting formula. Because satisfiability can be determined quickly using the DNF part of the equation, execution will proceed more quickly and efficiently than in prior art solutions.

QBF Solver Steps and System

Figure 2:
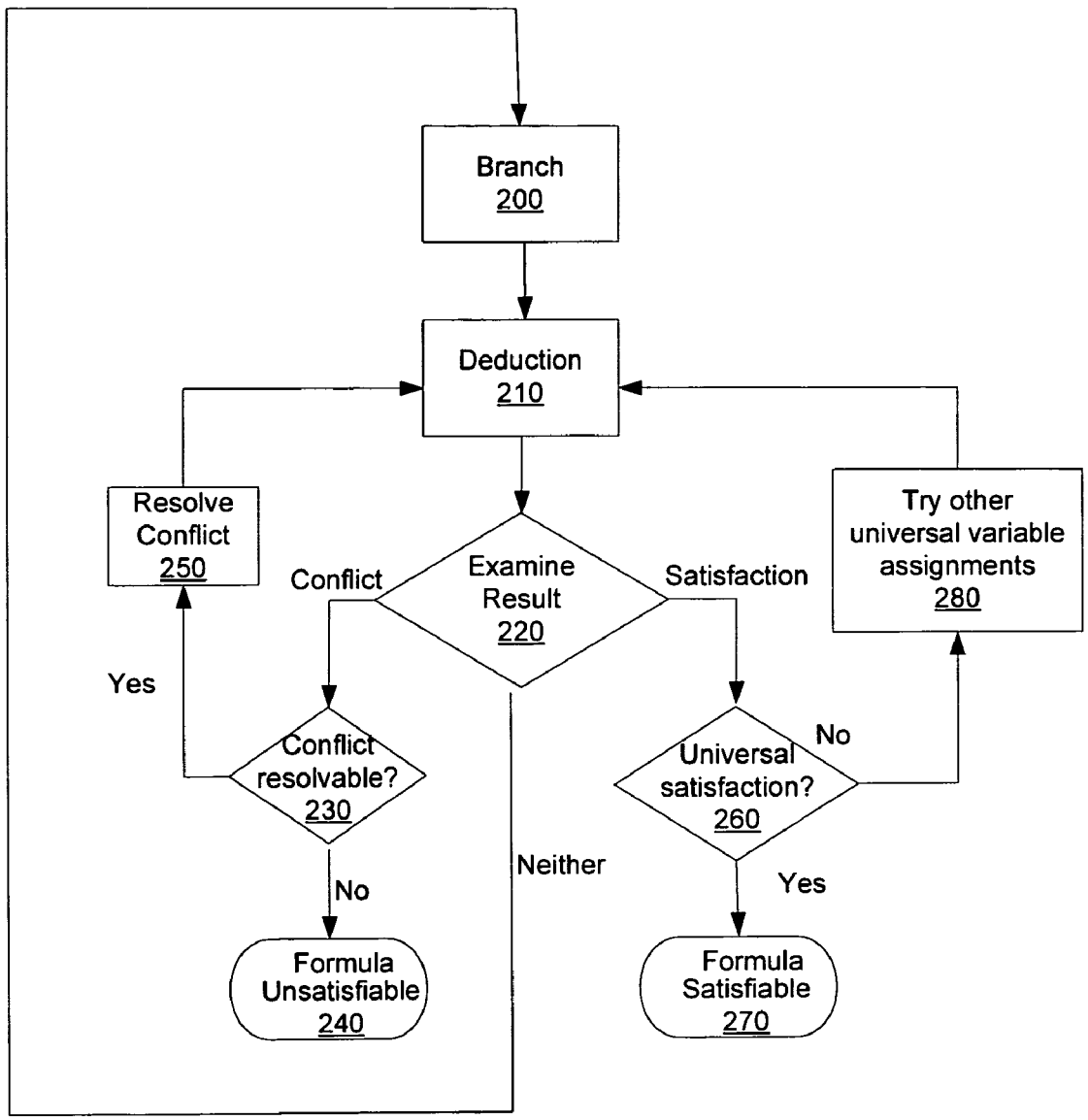
FIG. 2 is a flow diagram depicting a method of determining if a QBF formula is satisfiable according to one embodiment of the invention.

FIG. 2 is a flow diagram depicting a method of determining if a QBF formula is satisfiable according to one embodiment of the invention. As shown in FIG. 2, branch step 200 is the branching process. The branch step 200 assigns a value to a variable in order to attempt to determine satisfiability or conflict. The next step, deduction step 210, is to determine whether the assignment produces a possible conflict. This may be done by determining if any clauses ($C_1 \ldots C_k$) is conflicting according to some rules. If this is the case, then the conflict is resolved. Deduction step 210 also determines whether the assignment is satisfying for a cube, ($S_1 \ldots S_k$). If it is, the satisfaction must be resolved, because satisfaction must be determined for all the values of a variable which is subject to a universal quantifier.

Thus, after deduction step 210, the deduction result is examined, step 220. If a conflict has been found, then a determination is made as to whether the conflict can be resolved, step 230. If so, the conflict is resolved at step 250 and the deduction step 210 is continued. If not, the formula is unsatisfiable, end step 240. Similarly, if the deduction result indicates satisfaction, then a determination is made as to whether the satisfaction is universal, step 260. If it is universal (e.g. if all values of all variables subject to universal quantifiers produce satisfaction), then the formula is satisfiable, end step 270. If not, then another universal variable assignments are tried at 280, and deduction continues at 210.

Additionally, if at the end of deduction neither conflict or satisfaction has been achieved, the branch step 210 is returned to. Additional variable assignments are made. This process continues until an unresolvable conflict has been found which results in a determination of unsatisfiability, or until a satisfaction which is universal is found.

Figure 3:
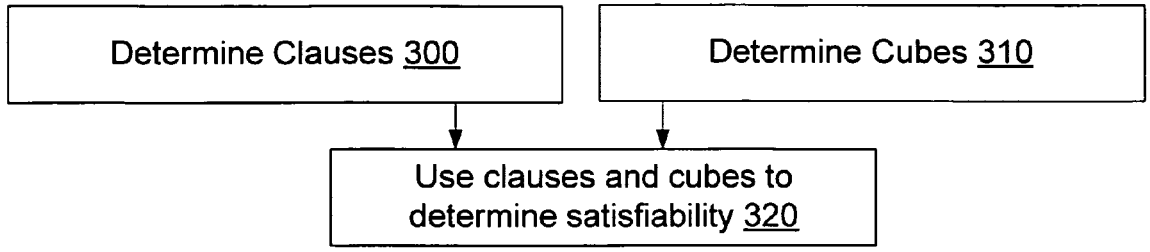
FIG. 3 is a flow diagram of a method for determining satisfiability of a QBF according to one embodiment of the invention.

FIG. 3 is a flow diagram of a method for determining satisfiability of a QBF according to one embodiment of the invention. As shown in FIG. 3, in a first step 300, a set of clauses is determined where each of said clauses comprises a logical and of literals, where if any of the set of clauses is unsatisfiable when modified by a given set of quantifiers, the QBF formula is unsatisfiable. In a second step 310, a set of cubes is determined where each of said cubes comprises a logical or of literals, where if any of the cubes are satisfiable when modified by the given set of quantifiers, the QBF formula is satisfiable. In a third step 320, the clauses and cubes are used to determine whether the formula is satisfiable.

Figure 4:
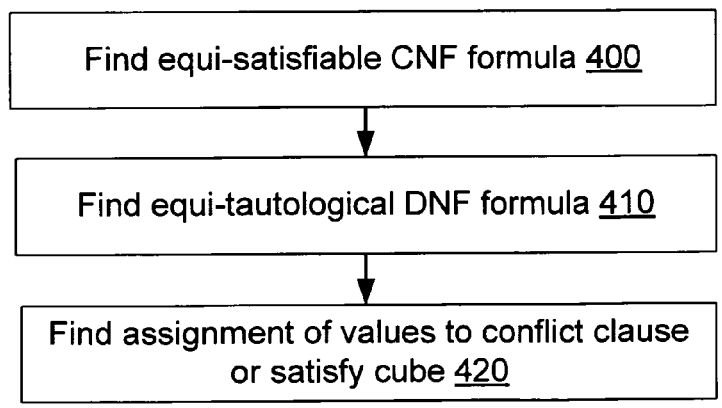
FIG. 4 is a flow diagram of a method for determining satisfiability of a QBF according to one embodiment of the invention.

FIG. 4 is a flow diagram of a method for determining satisfiability of a QBF according to one embodiment of the invention. As shown in FIG. 4, in a first step 400, a CNF formula is found which is equi-satisfiable to the QBF formula. In a second step 410, a DNF formula is found which is equi-tautological to the QBF formula. In a third step 420, an assignment of values to the variables of the CNF and DNF formulas is found which either causes a clause of the CNF formula to be conflict or causes a cube of the DNF formula to be satisfied. In a fourth step 420, the QBF formula is determined to be satisfiable if an assignment was found which causes a clause to be conflict, and determined to be unsatisfiable if an assignment was found which causes a cube to be satisfied.

Figure 5:
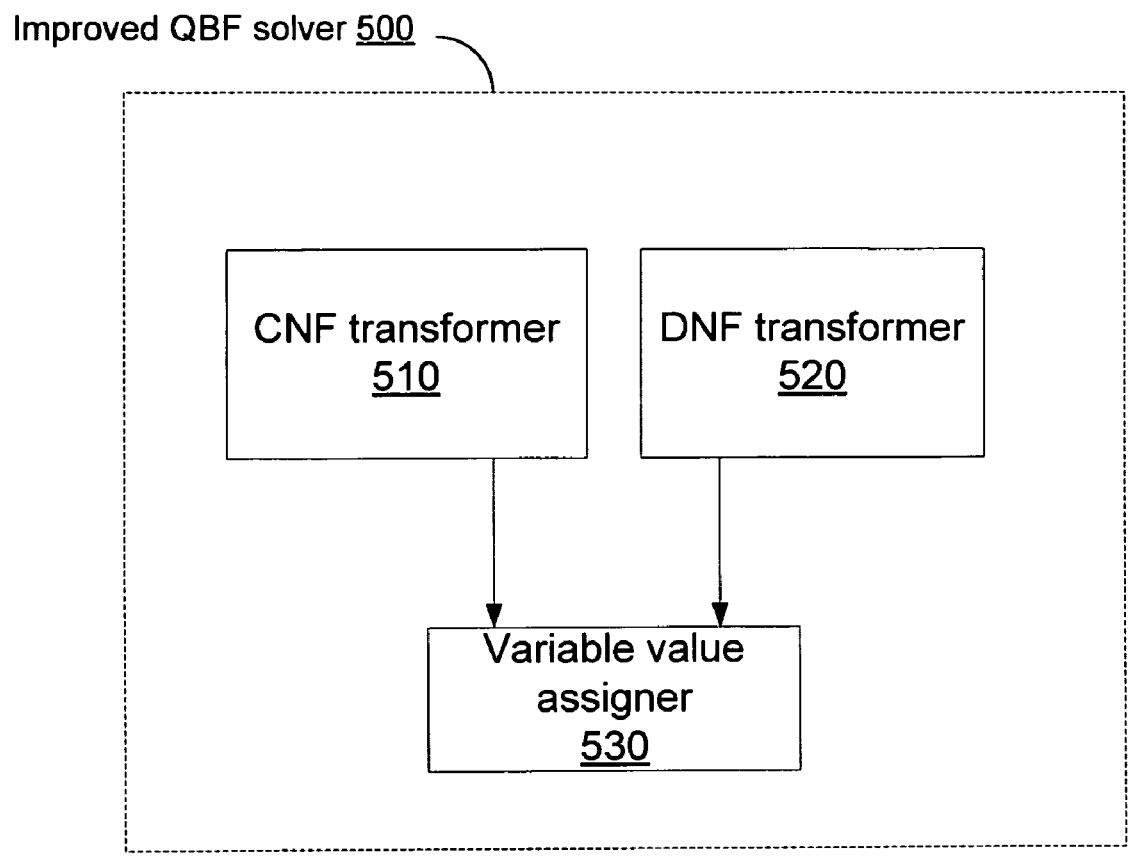
FIG. 5 is a block diagram of a system according to one embodiment of the invention.

FIG. 5 is a block diagram of a system according to one embodiment of the invention. In FIG. 5, an improved QBF solver 500 consists of a CNF transformer 510 which transforms the QBF formula to be solved into conjunctive normal form. A DNF transformer 520 transforms the QBF formula to be solved into disjunctive normal form. And a variable value assigner uses the clauses of the CNF formula and the cubes of the DNF formula to determine whether the QBF formula is satisfiable.

Uses of QBF Solver

As discussed above, the QBF problem is P-Space complete. This means that every problem in the P-Space arena can be reduced to a QBF problem in polynomial time, and that the QBF problem is useful for any problem in P-Space. Generally, in the computational complexity arena, new problems are often generated and reduced to an existing problem. Thus, the utility of existing problems is continually increased. QBF solvers are useful in a range of different contexts—model checking, program verification, sequential circuit verification, AI planning. Thus the use of a QBF solver according to the techniques of the invention can more efficiently accomplish one of these tasks.

CONCLUSION

It is noted that the foregoing examples have been provided merely for the purpose of explanation and are in no way to be construed as limiting of the present invention. While the invention has been described with reference to various embodiments, it is understood that the words which have been used herein are words of description and illustration, rather than words of limitations. Further, although the invention has been described herein with reference to particular means, materials and embodiments, the invention is not intended to be limited to the particulars disclosed herein; rather, the invention extends to all functionally equivalent structures, methods and uses, such as are within the scope of the appended claims. Those skilled in the art, having the benefit of the teachings of this specification, may effect numerous modifications thereto and changes may be made without departing from the scope and spirit of the invention in its aspects.

What is claimed:

1. A computer-readable medium comprising computer-executable instructions for determining satisfiability of a Quantified Boolean Formula (QBF) formula comprising:

finding a Conjunctive Normal Form (CNF) formula which is equi-satisfiable to the QBF formula;

finding a Disjunctive Normal Form (DNF) formula which is equi-tautological to the QBF formula;

finding an assignment of values to variables of the CNF and DNF formulas which either causes a clause of the CNF formula to be conflict or which causes a cube of the DNF formula to be satisfied;

performing a satisfiability determination comprising determining that the QBF formula is unsatisfiable if an assignment of values is found which causes a cube of the DNF formula to be satisfied; and performing a task comprising model checking, program verification, sequential circuit verification or artificial intelligence planning in accordance with the satisfiability determination.

2. The computer-readable medium of claim 1 wherein the computer executable instructions further comprise determining that the QBF formula is satisfiable if an assignment is found which causes a clause of the CNF formula to be conflict.

3. A method for determining satisfiability of a Quantified Boolean Formula (QBF) formula comprising:
- finding a Conjunctive Normal Form (CNF) formula which is equi-satisfiable to the QBF formula;
- finding a Disjunctive Normal Form (DNF) formula which is equi-tautological to the QBF formula;
- finding an assignment of values to variables of the CNF and DNF formulas which either causes a clause of the CNF formula to be conflict or which causes a cube of the DNF formula to be satisfied;
- performing a satisfiability determination comprising determining that the QBF formula is unsatisfiable if an assignment of values is found which causes a cube of the DNF formula to be satisfied; and
- performing a task comprising model checking, program verification, sequential circuit verification or artificial intelligence planning in accordance with the satisfiability determination.

4. The method of claim 3 further comprising determining that the QBF formula is satisfiable if an assignment is found which causes a clause of the CNF formula to be conflict.

5. A system for satisfying a Quantified Boolean Formula (QBF) formula comprising:
- a processor operative to execute computer-executable instructions; and
- memory having stored therein computer-executable instructions comprising:
  - finding a Conjunctive Normal Form (CNF) formula which is equi-satisfiable to the QBF formula;
  - finding a Disjunctive Normal Form (DNF) formula which is equi-tautological to the QBF formula;
  - finding an assignment of values to variables of the CNF and DNF formulas which either causes a clause of the CNF formula to be conflict or which causes a cube of the DNF formula to be satisfied;
  - performing a satisfiability determination comprising determining that the QBF formula is unsatisfiable if an assignment of values is found which causes a cube of the DNF formula to be satisfied; and
  - performing a task comprising model checking, program verification, sequential circuit verification or artificial intelligence planning in accordance with the satisfiability determination.

6. The system of claim 5 wherein the computer executable instructions further comprise determining that the QBF formula is satisfiable if an assignment is found which causes a clause of the CNF formula to be conflict.

* * * * *